United States Patent [19]

Onder

[11] 4,072,665

[45] Feb. 7, 1978

[54] POLYAMIDE FROM ARYLENE DIAMINE, ISOPHTHALIC ACID AND ALKYLENE DICARBOXYLIC ACID

[75] Inventor: Besir K. Onder, North Haven, Conn.

[73] Assignee: The Upjohn Company, Kalamazoo, Mich.

[21] Appl. No.: 664,764

[22] Filed: Mar. 8, 1976

[51] Int. Cl.² ............................................. C08G 69/26
[52] U.S. Cl. ............................ 260/78 R; 260/33.4 R; 260/47 CZ; 260/47 CB; 260/63 N; 260/65; 428/474
[58] Field of Search ....................................... 260/78 R

[56] References Cited

U.S. PATENT DOCUMENTS

| | | | |
|---|---|---|---|
| 3,408,334 | 10/1968 | Caldwell et al. | 260/78 R |
| 3,673,162 | 6/1972 | Buckley et al. | 260/78 R |
| 3,723,396 | 3/1973 | Jones et al. | 260/78 R |
| 3,816,369 | 6/1974 | Thomas et al. | 260/78 R |
| 3,960,819 | 6/1976 | Jones et al. | 260/78 R |

*Primary Examiner*—Harold D. Anderson
*Attorney, Agent, or Firm*—James S. Rose; Denis A. Firth

[57] ABSTRACT

Novel copolyamides having the recurring unit

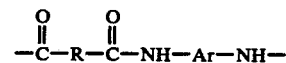

are disclosed wherein R, in 60 percent to 85 percent of the recurring units, is $-(CH_2)_x-$ wherein $x$ is an integer from 7 to 12 inclusive, and, in 15 percent to 40 percent of the recurring units, R is m-phenylene; and Ar is an arylene radical. The copolyamides are characterized by ease of melt processing such as in molding, extruding, and injection molding, while at the same time possessing good high temperature stability, and being further characterized by unexpectedly high impact and flexural strengths.

6 Claims, No Drawings

POLYAMIDE FROM ARYLENE DIAMINE, ISOPHTHALIC ACID AND ALKYLENE DICARBOXYLIC ACID

BACKGROUND OF THE INVENTION

1. Field of the Invention

This invention relates to the preparation of copolyamides and is particularly concerned with aromatic-aliphatic copolyamides.

2. Description of the Prior Art

Various types of polyamide polymers are known to those skilled in the art, see for example The Encyclopedia of Polymer Science and Technology, Vol. 10, pp. 347–593, 1969, Interscience Publishers, New York, N.Y. The various kinds of repeating units disclosed therein which are linked by the carbonamide group

determine the variation in physical properties observed for the different types of polyamides. Physical properties like melting point and solubility are almost solely dependent on the type of repeating unit employed. For example, when all the repeating units are aromatic the polyamide has such a high melting point that melt processability, such as injection molding, is precluded because polymer decomposition begins to occur before the melt stage is ever reached.

Alternatively, when the repeating units are mixed aliphatic-aromatic, as in the case of a polyamide prepared from an aliphatic dicarboxylic acid and an aromatic diamine, the polymer is injection-moldable but because of high crystallinity is brittle, opaque, and possessed of low elongation. In fact, when the dicarboxylic acid component is either adipic, pimelic or suberic acid and the aromatic diamine is 4,4'-methylenedianiline the corresponding polyamides have decomposition temperatures below their melting points. This behaviour precludes melt processing these polymers; see J. Polymer Sci. 10, Part A-1, p. 1547, 1972. Finally, when the repeating units are all aliphatic as in nylon-6,6, the polymer is injection moldable but is limited in the end-use temperature to which it can be exposed.

The prior art discloses methods for the preparation of copolyamides derived from the reaction of mixtures of aliphatic dicarboxylic acids with aromatic dicarboxylic acids and aromatic diamines, or aromatic diisocyanates in either catalyzed melt condensation, solvent-interfacial condensation, or polar solvent condensation, as set forth in U.S. Pat. Nos. 3,408,334, 3,640,970, and 3,642,715 respectively.

Further, it is noted that mixtures of aliphatic dicarboxylic acids with minor amounts of aromatic dicarboxylic acids have been recognized as useful in the formation of copolyamides from bis(4-aminocyclohexyl)-methane (PACM), particularly in reference to the preparation of fibers as disclosed in U.S. Pat. No. 3,416,302. Broad ranges of mixtures of aromatic and aliphatic dicarboxylic acids have been reacted with meta-xylylenediamine (and mixtures of at least 50 percent meta-with para-xylylenediamine) and mixtures of xylylenediamines with aliphatic diamines to produce transparent injection moldable polyamides; see Netherlands specification Nos. 7212060 and 7304471.

The prior art does not disclose a polyamide composition which is easily injection molded and at the same time characterized by a higher end-use temperature as compared with aliphatic polyamides, and in possession of high impact strengths.

The copolyamides prepared in accordance with the present invention meet the above requirements and, furthermore, are characterized by unexpectedly high impact strengths.

SUMMARY OF THE INVENTION

This invention comprises a copolyamide having the recurring unit

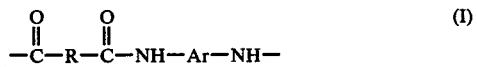

wherein R, in 60% to 85 percent of the recurring units, is

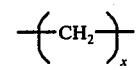

wherein $x$ represents an integer from 7 to 12 inclusive and in 15% to 40 percent of the recurring units R is m-phenylene, and Ar is an arylene radical.

The term "arylene" means a radical obtained by removing two nuclear hydrogen atoms from an aromatic hydrocarbon, and is inclusive of phenylene, tolylene, naphthylene, diphenylylene, and divalent radicals having the formula

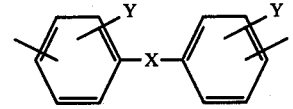

wherein X is selected from the group consisting of

—O—, and lower alkylene from $C_1$ to $C_4$; and Y is selected from the group consisting of hydrogen, lower alkyl from $C_1$ to $C_4$, lower alkoxy from $C_1$ to $C_4$, and halogen; and further provided that the valencies of the arylene radicals are in the para, or meta configuration when said valencies are on the same aromatic ring, and in the para, para', or the meta, meta' configuration when said valencies are on different aromatic rings; and mixtures of the above arylene radicals.

The term "lower alkylene from $C_1$ to $C_4$" means alkylene having from 1 to 4 carbon atoms, inclusive, such as methylene, ethylene, propylene, butylene, and isomeric forms thereof.

The term "lower alkyl from $C_1$ to $C_4$" means alkyl having from 1 to 4 carbon atoms, inclusive, such as methyl, ethyl, propyl, butyl, and isomeric forms thereof.

The term "lower alkoxy from $C_1$ to $C_4$" means alkoxy having from 1 to 4 carbon atoms, inclusive, such as methoxy, ethoxy, propoxy, butoxy, and isomeric forms thereof.

DETAILED DESCRIPTION OF THE INVENTION

It is an object of the present invention to provide copolyamides that are characterized by ease of melt processability and at the same time can withstand high end-use temperatures in comparison to aliphatic polyamides well known in the art. It is a further object of the present invention to provide copolyamides that are characterized by a range of physical properties of sufficiently high caliber to enable the polymers to be useful engineering thermoplastic materials.

The foregoing objects and others are accomplished by providing a copolyamide comprised of the recurring unit (I) set forth hereinabove. The proportion of the recurring units wherein R is $-(CH_2)_x-$ is advantageously from 60 to 85 percent, and preferably from 65 to 75 percent. Correspondingly, the proportion of the recurring units wherein R is m-phenylene is advantageously from 15 to 40 percent, and preferably from 25 to 35 percent. A most preferred combination is when about 70 percent of the recurring units are $-(CH_2)_x-$ and about 30 percent are m-phenylene.

This range for R of from 60 – 85 percent for the polymethylene units and 15 – 40 percent for m-phenylene is critical to the copolyamides of the present invention. For if the polymethylene content is raised above 85 percent, the copolyamides are injection-moldable but because of their high crystallinity they are brittle, opaque, and possessed of low elongation. Conversely, if the m-phenylene content is raised above 40 percent the copolyamides are characterized by an increase in shear modulus as they are heated, due to the crystallization of the m-phenylene-arylene blocks. This increase in stiffness prevents injection-moldability and leads to the characteristic behaviour of totally aromatic polyamides wherein the decomposition temperature is reached before melting occurs.

Contrastingly, when the copolyamides are within the specific ranges called for by the present invention they accomplish the foregoing objects, and additionally give rise to certain unexpected results which will be discussed in detail hereinafter.

The value of $x$ in the polymethylene unit $-(CH_2)_x-$ advantageously is from 7 to 12 inclusive, and preferably is from 7 to 10 inclusive, and most preferably, the value of $x$ is 7.

Ar is an arylene radical having the definition set forth above and illustratively includes m-phenylene, p-phenylene, 2,4-tolylene, 2,6-tolylene, and mixtures of 2,4-, and 2,6-tolylene, 1,5-naphthylene, 4,4'-biphenylene, 4,4'-oxydiphenylene, 4,4'-carbonyldiphenylene, 4,4'-isopropylidenediphenylene, 4,4'-methylenediphenylene, 3,3'-dimethyl 4,4'-methylenediphenylene, 3,3'-methylenediphenylene, and the like, and mixtures thereof. A preferred arylene radical is 4,4'-methylenediphenylene.

The valencies of the arylene radicals should be in the para, or meta configuration when said valencies are on the same aromatic ring, and in the para, para' or meta, meta' when said valencies are on different aromatic rings, otherwise the polymer chains cannot pack properly which has a detrimental effect on polymer physical properties.

Combinations of arylene radicals are contemplated by the teaching of the present invention and a preferred combination comprises mixtures of 4,4'-methylenediphenylene with a member selected from the group consisting of 2,4-tolylene, 2,6-tolylene, and mixtures thereof.

The copolyamides in accordance with the present invention are characterized by ease of melt processing because of reduced polymer crystallinity. For example, molding, extrusion, and injection molding are possible with the absence of polymer degradation and without an increase in polymer shear modulus. Yet at the same time the polymers have such high aromatic content that this gives rise to high polymer glass transition temperatures and thereby good high temperature polymer stability (such as heat deflection temperatures).

The copolyamides of the invention are characterized by Mn molecular weights of from about 10,000 to about 50,000 as determined by gel permeation chromatography.

Additionally, the copolyamides are considered to be random polymers, in contrast to block polymers, and to possess overall amorphous structure. This gives rise to the added advantage of good polymer transparency.

Unexpectedly, the copolyamides of the invention are characterized by very high impact strengths, much higher than heretofore observed for polyamides possessing such high glass transition temperatures (Tg of up to 200° C).

Furthermore, the copolyamides possess surprisingly strong tensile strength at yield, and high elongation, notwithstanding their high aromatic content which is normally recognized by those skilled in the art as giving rise to low tensile and elongation values in polyamides.

Also, in spite of the high aromatic content the copolyamides have good solubility in those solvents normally employed for polyamides. Illustrative of such solvents are the phenolic solvents such as meta-cresol, cresylic acid, and the like; polar liquids such as linear or cyclic amides or phosphoramides, for example, N,N-dimethylformamide, N,N-dimethylacetamide, N-methylpyrrolidone, tetramethylenesulfone, and the like. This allows the copolyamides of the present invention to be used in those applications calling for solutions such as in the preparation of films, coatings, lamination, and the like.

The copolyamides are further characterized by showing much lower moisture absorption than polyamides of comparable melt processing characteristics, i.e., a maximum moisture pick-up under equilibrium conditions of about 1.5 to 2.0 percent compared to greater than 6.0 percent for nylon-6,6 under 100% relative humidity.

The copolyamides having the recurring unit (I) are easily prepared by methods well known to those skilled in the polymer art. For example, a convenient procedure is the melt condensation process set forth in U.S. Pat. No. 3,408,334, whose disclosure is hereby incorporated by reference. A dicarboxylic acid (II) wherein R is as defined hereinabove and an aromatic diamine (III) wherein Ar is defined as above

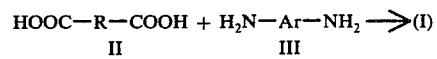
$$\text{HOOC—R—COOH} + \text{H}_2\text{N—Ar—NH}_2 \longrightarrow \text{(I)}$$
$$\text{II} \qquad\qquad \text{III}$$

are reacted to form the polymer (I).

Another convenient process is the solution technique of U.S. Pat. No. 3,640,970, whose disclosure is hereby incorporated by reference, wherein the diacid halide corresponding to the diacid (II) is reacted with (III) in solution to form (I). And yet another process is that set forth in U.S. Pat. No. 3,642,715, whose disclosure is hereby incorporated by reference, wherein the diisocyanate corresponding to (III) is reacted in solution with (II) to form the copolyamides (I) of the present invention.

When the acid chloride process is employed to prepare the copolyamides of the present invention it is advantageous to employ a polymer chain capping agent to assist in polymer stabilization and molecular weight reproduceability. Suitable capping agents are mono acid chlorides, as for example, benzoyl chloride, or palmitoyl chloride, and the like. The capping agent is employed in excess over the equivalent stoichiometric acid chloride content in a range of from about 0.25 equivalent percent to about 1.0 equivalent percent.

The melt condensation technique is the least preferred because of the tendency for side reactions to occur at the elevated temperatures encountered in melt polymerization.

Yields from either the acid chloride route or, the diisocyanate route are normally as high as 99%. Polymer molecular weight is characterized by an inherent viscosity of at least 0.4 when determined at 30° C in m-cresol at 0.5% concentration.

Generally speaking, the use of a polymerization catalyst is advantageous and a preferred group of catalysts for the polymerization of diisocyanates and dicarboxylic acids are the N-alkali metal lactamates such as potassium propiolactamate, potassium pyrrolidone, sodium caprolactamate, and the like, and the alkali metal alkoxides, such as sodium methoxide, sodium ethoxide, sodium phenoxide, and the like, disclosed in copending applications Ser. No. 521,745 filed Nov. 7, 1974 now U.S. Pat. No. 4,021,412, and Ser. No. 521,744 filed Nov. 7, 1974 now U.S. Pat. No. 4,001,186 respectively.

Illustrative of the diacids (II) (or the corresponding diacid chlorides thereof) useful in the present invention are, azelaic acid (azelaoyl chloride), sebacic acid (sebacoyl chloride), undecanedioic acid (undecanedioyl chloride), dodecanedioic acid (dodecanedioyl chloride), tridecanedioic acid (tridecanedioyl chloride), and tetradecanedioic acid (tetradecanedioyl chloride).

Copolyamides within the scope of the present invention include those in which minor amounts of up to about 10% of the recurring units are different from those set forth above, and include recurring units wherein R is derived from an aliphatic, aromatic, or alicyclic dicarboxylic acid other than those set forth above. Illustratively, this includes terephthalic acid, 5-nitroisophthalic acid, 4,4'-benzophenonedicarboxylic acid, 4,4'-dicarboxydiphenyl ether and the like; malonic acid, succinic acid, glutaric acid, adipic acid, 1,4-cyclohexanedicarboxylic acid, and the like.

Illustrative of the diamines (III) (or the corresponding diisocyanates thereof) useful in the present invention are, m-phenylenediamine (m-phenylenediisocyanate), p-phenylenediamine (p-phenylenediisocyanate), 2,4-tolylenediamine (2,4-tolylenediisocyanate), 2,6-tolylenediamine (2,6-tolylenediisocyanate), and mixtures of the 2,4- and 2,6-tolylenediamine (and the diisocyanates thereof), 1,5-naphthylenediamine (1,5-naphthylenediisocyanate), 4,4'-diaminobiphenyl (4,4'-diisocyanatobiphenyl), 4,4'-diaminodiphenylether (4,4'-diisocyanatodiphenylether), 2,2-(4,4'-diaminodiphenyl)propane [2,2-(4,4'-diisocyanatodiphenyl)propane], 4,4'-diaminobenzophenone (4,4'-diisocyanatobenzophenone), 4,4'-diaminodiphenylmethane (4,4'-diisocyanatodiphenylmethane), 3,3'-dimethyl-4,4'-diaminodiphenylmethane (3,3'-dimethyl-4,4'-diisocyanatodiphenylmethane), 3,3'-diaminodiphenylmethane (3,3'-diisocyanatodiphenylmethane), and the like, and mixtures thereof.

Additives such as antioxidants, dyes, fire retardants, and the like may be added to solutions of the polymers of the present invention in solvents of the type set forth above. Alternatively the additives may be added to the dry powdered polymers either prior to, or during, processing steps such as molding, extruding, injection molding and the like.

The copolyamides prepared in accordance with the present invention can be used as molding powders, for the preparation of fibers and coatings from solution, for injection molding of articles, and the like. The solid polymers so obtained can be used in bushings, seal faces, electric insulators, compressor vanes and impellers, pistons and piston rings, gears, thread guides, cams, brake lining, clutch faces, abrasive articles. Further, coatings of the copolyamides of the present invention are useful in wire coating, in casting films, or spraying polymer films on a variety of substrates such as metal, ceramic, fabrics, polymerics, and the like.

The following examples describe the manner and process of making and using the invention and set forth the best mode contemplated by the inventors of carrying out the invention but are not to be construed as limiting.

EXAMPLE 1

A 2000 ml. resin flask equipped with a mechanical stirrer, addition funnel, thermometer, a nitrogen inlet tube (entering below the surface of the reaction mixture), and a reflux condenser equipped with a gas outlet tube, was thoroughly dried by heating with an electric heat gun while under a constant flow of dry $N_2$ gas.

After cooling to room temperature, 158.63 g. (0.8 mole) of 4,4'-methylenedianiline [freshly distilled: b.p. (at 1.5 m.m. Hg.) = 200° C] was charged to the flask along with 900 g. of dimethylacetamide (DMAc) (distilled from calcium hydride and stored over 3 A molecular sieves) and the mixture stirred to form a slightly colored solution. It was cooled to −20° C by a dry-ice acetone bath.

The addition funnel was charged with a mixture of 126.07 g. (0.56 mole) of azelaoyl chloride, 48.73 g. (0.24 mole) of isophthaloyl chloride, 2.75 g. (0.01 mole) of palmitoyl chloride (used as a chain capping agent), and 75 g. of dimethylacetamide. The contents of the addition funnel were added dropwise during continual stirring and cooling, over a period of 11 minutes whereupon the temperature rose from −20° C to 0° C. After about 10 minutes the solution turned milky due to the formation of the DMAc. HCl salt. A rinse of 125 g. of DMAc was added from the addition funnel to yield a solution of about 20 percent solids. The reaction mixture was stirred overnight and allowed to return to room temperature.

The polymer solution was neutralized by slowly pouring it into 3 gallons of water in which 169.6 g. (1.6 mole) of $Na_2CO_3$ (anhydrous) had been dissolved. The polymer precipitated as rope-like strands. It was pulverized in a Waring blender with water, filtered, washed again by stirring with 3 gallons of water containing 106 g. (1.0 mole) of $Na_2CO_3$, filtered, and washed twice with fresh water, or until the wash water was neutral to pH test paper. The polymer was filtered in a coarse porosity funnel and dried initially at 100° – 105° C overnight in a circulating oven. Final drying was accomplished at 140° - 145° C under vacuum of about 0.1 mm for 8 hours. The copolyamide had an ηinh at 30° C (0.5% in m-cresol)=1.01 and corresponded to the following structure

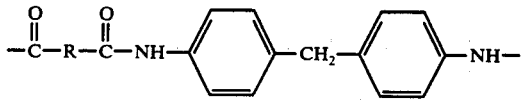

wherein R in about 70 percent of the recurring units is

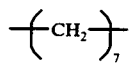

and in about 30 percent of the recurring units

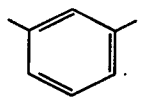

The powdered copolyamide was dry-blended with 1% (by wt.) of N,N'-bis[3-(3',5'-di-t-butyl-4'-hydroxyphenyl)propionyl]hexamethylenediamine (Irganox-1098, an antioxidant supplied by Ciba-Geigy Corp., Ardsley, N.Y.) then extruded into smooth rods using a Brabender Plasti-Corder (Brabender Instruments Inc., South Hackensack, N.J.). Extrusion conditions were as follows, screw speed = 40 r.p.m.; die size ¼ diameter; temperature conditions: zone 1 = 270° C; zone 2 = 270° C; zone 3 = 260° C; and zone 4 = 250° C.

Test bars were prepared by placing a 5 inch length of the extruded rod (approximately 10 g.) in an ASTM ½ × 5 inch bar mold preheated to 180° C and compression molding the sample at 180° C and 4,000 psi. The following physical properties represent the average values derived from the measurements of five different test bars.

| | |
|---|---|
| Tensile str. at yield (psi) | 11,400 |
| Tensile modulus (psi) | 167,000 |
| Elongation, % | 21.9% |
| Izod impact str., (ft.-lb./in. notch)[1] | 3.19 |
| Heat deflection temp. at 264 psi[2] | 140° C |

Footnotes:
[1]ASTM Test Method D256-56
[2]ASTM Test Method D648-56

EXAMPLE 2

Using the same apparatus and procedure described in Example 1, a copolyamide in accordance with the present invention was prepared using the same ingredients and proportions, except that 108.06 g. (0.48 mole) of azelaoyl chloride, and 64.97 g. (0.32 mole) of isophthaloyl chloride were employed and no palmitoyl chloride capping agent was used.

The work-up procedure of the polymer product differed slightly from Example 1 in that, after stirring overnight, 58.3 g. of powdered Ca(OH)₂ was stirred with the DMAc solution to neutralize the DMAc.HCl followed by addition of 1.65 g. (approximately 0.6 wt.%) of the antioxidant Irganox 1098. The polymer product was isolated from the DMAc solution, washed, and dried according to the procedure described in Example 1. Thus there was obtained a copolyamide which had an ηinh at 30° C (0.5% in m-cresol)=1.77 and corresponded to the following structure

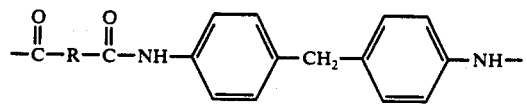

wherein R in 60 percent of the recurring units is —CH₂)₇ and in 40 percent of the recurring units is

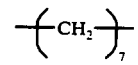

and in 40 percent of the recurring units is

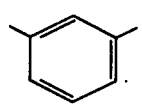

The powdered copolyamide was extruded and molded into ½ × 5 inch test bars according to the procedures outlined in Example 1 and had the following properties

| | |
|---|---|
| Density (g/cc.) | 1.198 |
| Gehman[1], Tg | 172° C |
| DTA[2], Tg | 174° C |
| Tensile str. at yield (psi) | 13,390 |
| Tensile modulus (psi) | 259,700 |
| Elongation | 10.5% |
| Unnotched Impact str. (ft.-lbs.) | 21.8 |
| Izod Impact (ft.-lb./in.) | 2.76 |
| Heat deflection temp. at 264 psi | 177° C |
| Flexural str. (psi) | 21,282 |
| Flexural modulus | 368,000 |

Footnotes:
[1]Gehman, Tg: Glass transition temperature determined from a plot of shear modulus vs. temperature determined using the procedure of ASTM D 1053 - 58T on a modified Gehman Torsion Stiffness Tester, fitted with a heavy duty furnace to allow operation up to 500° C.
[2]DTA,Tg: Glass transition temperature determined from a differential thermal analysis scan obtained using a DuPont 900 Thermal Analyzer instrument, under N₂ at a heating rate of 20° C/min.

EXAMPLE 3

The following examples and data set forth in Table I show a comparison of the physical properties of three copolyamides prepared in accordance with the present invention. The procedure and ingredients described in Example 1 were employed and the proportions of isophthaloyl chloride and azelaoyl chloride were chosen to provide copolyamides corresponding to the formula

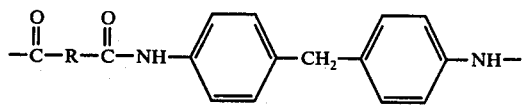

wherein the R in the recurring units are in the molar ratio of m-phenylene: —(CH₂)₇, set forth in Table I.

The data clearly shows an improvement in polymer properties as the m-phenylene molar content increases from 20 to 40 M%. However, a plot of the Gehman shear modulus vs. temperature using the procedure of ASTM D 1053 — 58T (noted in Footnote 1 of Example 2) for the 40/60 sample when heated from 100° to 280° C, displays a modulus decrease from $10^{10}$ dynes/cm$^2$ to almost $10^6$ dynes/cm$^2$ until at 260° C it begins a sharp increase in modulus. This shear modulus increase, which is caused by the crystallization of m-phenylene-MDA blocks, clearly shows that melt processing, i.e., injection molding, is becoming more difficult.

The Gehman shear modulus vs. temperature plot for the 30/70 sample, over the same temperature range drops to well below $10^6$ dynes/cm$^2$ before 250° C. And the plot for the 20/80 sample, drops from $10^{10}$ to $10^7$ dynes/cm$^2$ over a temperature range of 100° to 180° C, whereupon it increases to $10^8$, until at about 250° C it drops from $10^8$ to below $10^6$.

The increase in the modulus of the latter sample and its subsequent decrease, corresponds to the crystallization of the azelamide blocks followed by their melting respectively. However, this 20/80 sample, like the 30/70 one, is easily melt processable as shown by its shear modulus behaviour.

TABLE I

| Property | R 20/80 | R 30/70 | R 40/60 |
|---|---|---|---|
| $\eta_{0.5}$ at 30° C (m-cresol) | 0.98 | 0.91 | 1.77 |
| density, gm/cc. | | 1.18 | |
| Tensile str. at yield, psi | 6200* | 10,900 | 13,400 |
| Tensile mod., psi | 147,000 | 196,000 | 260,000 |
| Elongation, % | 5.1 | 8.4 | 10.5 |
| Flexural str., psi | | 18,900 | 21,300 |
| Flexural mod., psi | | 387,000 | 368,000 |
| Izod Impact ft.-lbs./in. | | | |
| unnotched | 6.7 | 12.3 | >20 |
| notched | | 2.5 | 2.7 |
| Heat deflection temp. (° C) at 264 psi | | 173 | 177 |
| Gehman Tg (° C) | 146 | 168 | 173 |
| DTA Tg (° C) | 155 | 165 | |

Footnote:
*Tensile str. at break

EXAMPLE 4

A 300 ml. resin flask was equipped with a mechanical stirrer, a N$_2$ inlet bleeder, an addition funnel, and a reflux condenser, equipped with a gas outlet tube.

The flask was charged with 4.98 g. (0.03 mole) of pure isophthalic acid, 13.18 g. (0.07 mole) of azelaic acid (twice recrystallized from chloroform), and 0.035 g. of sodium methoxide. The flask was heated with a propane torch while a steady flow of N$_2$ passed through the apparatus. When the flask had cooled to room temperature, 75 ml. of distilled tetramethylenesulfone (TMS) was added to the flask and the acids dissolved to form a colorless solution. The solution was heated to 175° C by means of an electrically heated oil bath.

The contents of the addition funnel, which consisted of 25.0 g. (0.10 mole) of pure methylenebis(-phenylisocyanate) dissolved in 25 g. of tetramethylenesulfone, were added to the flask during constant stirring over a 5 hour period at 175° C. CO$_2$ evolution was noted during the reaction and shortly after completion of the diisocyanate addition, the reaction mixture became very viscous.

After standing overnight the polymer was precipitated and washed in acetone three times in a Waring blendor, dried overnight at 140° C, and subsequently demonstrated to be free of solvent by thermal gravimetric analysis. Thus there was obtained a copolyamide which had an $\eta$inh 0.5% at 30° C (m-cresol) = 0.70, and corresponded to the following structure

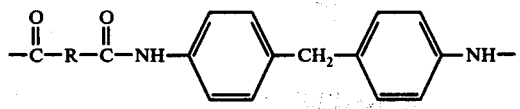

wherein R in about 70 percent of the recurring units is

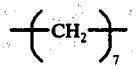

and in about 30 percent of the recurring units

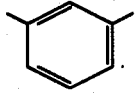

EXAMPLE 5

Using the apparatus and procedure described in Example 4 there is obtained a polyamide in accordance with the present invention when 19.76 g. (0.105 mole) of azelaic acid, 7.47 g. (0.045 mole) of isophthalic acid, and 0.06 g. of sodium methoxide are all dissolved in 125 ml. of stirred TMS and reacted with a combination of 5.22 g. (0.030 mole) of 2,4-toluene diisocyanate dissolved in 10 ml. of TMS and 30.0 g. (0.12 mole) of methylenebis(-phenylisocyanate) dissolved in 40 ml. of TMS. The copolyamide corresponds to the following structure

wherein R in 70 percent of the recurring units is

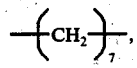

and in 30 percent of the recurring units is

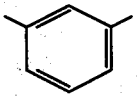

and Ar in 80 percent of the recurring units is

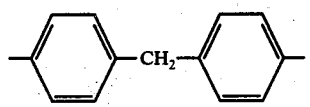

and in 20 percent of the recurring units is

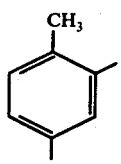

EXAMPLES 6 – 8

Using the apparatus and procedure of Example 1 and the same reactants and amounts except the azelaoyl chloride is replaced by an equimolar amount of the diacid chlorides of the corresponding acids set forth in Table II, there are obtained the following copolyamides in accordance with the present invention which corresponds to the following structure

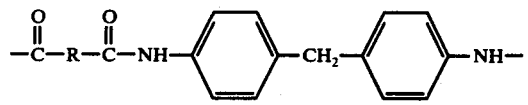

wherein R in 70 percent of the recurring units is $(CH_2)_x$ wherein the respective values of x are set forth in Table II; and in 30 percent of the recurring units R is

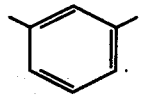

TABLE II

| | Diacid Chloride of | x |
|---|---|---|
| Example 6 | sebacic acid | 8 |
| Example 7 | dodecanedioic acid | 10 |
| Example 8 | tetradecanedioic acid | 12 |

EXAMPLE 9

A pelletized sample of the copolyamide prepared in accordance with the procedure set forth in Example 1 was injection molded on a 3½ ounce Model SKM-75 Stubbe (manufactured by Stubbe Div. of Demag Kunststoff Technik, Kalldorf, Germany) reciprocating screw injection molding machine at cylinder temperatures of 260° – 275° C into a heated mold kept at 130° to 150° C. Good molded pieces were obtained at cycle times of 20 to 40 seconds. Test pieces were removed and scrap was reground and reinjection molded under the same conditions noted above. The physical properties of the injection molded sample from the virgin pellets compared to those for the injection molded sample from reground scrap are set forth in Table III. The data clearly shows the retention of properties for the reprocessed scrap which establishes the truly thermoplastic nature of the copolyamide prepared in accordance with the present invention.

TABLE III

| Property | Virgin Pellets | 100% Regrind Scrap |
|---|---|---|
| Density, gm/cc. | 1.175 | |
| Tensile str. at yield, psi. | 11,950 | 11,400 |
| Tensile modulus, psi | 257,000 | 276,000 |
| Elongation % | 67.0 | 59.0 |
| Flexible str., psi | 15,270 | |
| Flexible modulus, psi | 281,200 | |
| Izod Impact notched ft.-lb./in. | 3.3 | |

I claim:

1. A fiber forming copolyamide consisting essentially of the recurring unit $$-\overset{O}{\underset{\|}{C}}-R-\overset{O}{\underset{\|}{C}}-NH-Ar-NH-$$

wherein R in 60 to 85 percent of the recurring units is

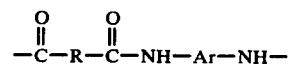

wherein x represents an integer from 7 to 12 inclusive and in 15 to 40 percent of the recurring units R is m-phenylene, and Ar is 4,4'-methylenediphenylene.

2. A copolyamide according to claim 1 wherein x is equal to 7.

3. A fiber forming copolyamide consisting essentially of the recurring unit

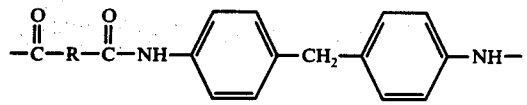

wherein R in about 65 to 75 percent of the recurring units is $-(CH_2)_x$ wherein x represents an integer from 7 to 12 inclusive and in 25 to 35 percent of the recurring units R is m-phenylene.

4. A copolyamide according to claim 3 wherein R is

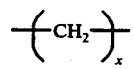

is about 70 percent of the recurring units and in the remaining 30 percent is m-phenylene.

5. A copolyamide according to claim 3 wherein x is equal to 7.

6. A fiber forming copolyamide consisting essentially of the recurring unit

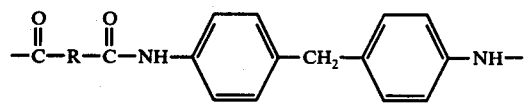

wherein R in about 70% of the recurring units is

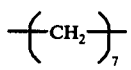

and in the remaining 30% is m-phenylene.

* * * * *

UNITED STATES PATENT OFFICE
CERTIFICATE OF CORRECTION

Patent No. 4,072,665    Dated February 7, 1978

Inventor(s) Besir K. Onder

It is certified that error appears in the above-identified patent and that said Letters Patent are hereby corrected as shown below:

Column 4, line 14:　　　　　　　　Should read:

$M_n$　　　　　　　　　　　　　　$\bar{M}_n$

Column 7, line 18　　　　　　　　Should read:

units　　　　　　　　　　　　　　units is

Column 7, line 32:　　　　　　　　Should read:

1/4 diameter　　　　　　　　　　1/4" diameter

Column 8, line 11:

delete line 11 in patent

Column 8, line 68:　　　　　　　　Should read:

—(Ch$_2$)$_7$　　　　　　　　　　—(CH$_2$)$_7$

Column 10, line 19:　　　　　　　Should read:

units　　　　　　　　　　　　　　units is

UNITED STATES PATENT OFFICE
CERTIFICATE OF CORRECTION

Patent No. 4,072,665  Dated February 7, 1978

Inventor(s) Besir K. Onder

It is certified that error appears in the above-identified patent and that said Letters Patent are hereby corrected as shown below:

Column 11, lines 18 and 19:   Should read:

corresponds                   correspond

Column 12, claim 4, line 49:  Should read:

is about                      in about

Signed and Sealed this

Fifteenth Day of August 1978

[SEAL]

Attest:

RUTH C. MASON
Attesting Officer

DONALD W. BANNER
Commissioner of Patents and Trademarks